United States Patent
Lee et al.

(10) Patent No.: US 12,113,220 B2
(45) Date of Patent: Oct. 8, 2024

(54) MULTI-LAYER NEGATIVE ELECTRODE COMPRISING NATURAL GRAPHITE AND ARTIFICIAL GRAPHITE AND LITHIUM SECONDARY BATTERY COMPRISING THE SAME

(71) Applicant: LG ENERGY SOLUTION, LTD., Seoul (KR)

(72) Inventors: Taek Soo Lee, Daejeon (KR); Chang Wan Koo, Daejeon (KR); Sang Hoon Choi, Daejeon (KR); Jung Min Yang, Cheongju-si (KR); Il Jae Moon, Incheon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

(21) Appl. No.: 17/850,570

(22) Filed: Jun. 27, 2022

(65) Prior Publication Data

US 2022/0328833 A1    Oct. 13, 2022

Related U.S. Application Data

(63) Continuation of application No. 16/063,837, filed as application No. PCT/KR2017/010697 on Sep. 27, 2017.

(30) Foreign Application Priority Data

Sep. 29, 2016 (KR) .................. 10-2016-0125261
Sep. 26, 2017 (KR) .................. 10-2017-0124177

(51) Int. Cl.
| | | |
|---|---|---|
| *H01M 4/587* | (2010.01) | |
| *H01M 4/02* | (2006.01) | |
| *H01M 4/133* | (2010.01) | |
| *H01M 4/36* | (2006.01) | |
| *H01M 4/62* | (2006.01) | |
| *H01M 10/0525* | (2010.01) | |

(52) U.S. Cl.
CPC .......... *H01M 4/587* (2013.01); *H01M 4/133* (2013.01); *H01M 4/364* (2013.01); *H01M 4/366* (2013.01); *H01M 4/621* (2013.01); *H01M 4/624* (2013.01); *H01M 10/0525* (2013.01); *H01M 2004/027* (2013.01)

(58) Field of Classification Search
CPC .... H01M 4/1393; H01M 4/133; H01M 4/364; H01M 4/366; H01M 4/587; H01M 4/621; H01M 4/624; H01M 10/0525; H01M 2004/027; Y02E 60/10
See application file for complete search history.

(56) References Cited

U.S. PATENT DOCUMENTS

| | | |
|---|---|---|
| 8,283,072 B2 | 10/2012 | Ando et al. |
| 10,026,956 B2 | 7/2018 | Kim et al. |
| 2006/0068293 A1* | 3/2006 | Kim .................. H01M 10/0569 429/231.95 |
| 2008/0241685 A1 | 10/2008 | Hinoki et al. |
| 2008/0241696 A1 | 10/2008 | Hinoki et al. |
| 2008/0274406 A1 | 11/2008 | Fuse et al. |
| 2010/0297500 A1 | 11/2010 | Kawai et al. |
| 2011/0123866 A1 | 5/2011 | Pan et al. |
| 2011/0171532 A1 | 7/2011 | Okanishi et al. |
| 2013/0164618 A1 | 6/2013 | Konishi |
| 2014/0186702 A1 | 7/2014 | Takahata |
| 2014/0212750 A1 | 7/2014 | Ahn et al. |
| 2014/0242430 A1 | 8/2014 | Takahata |
| 2014/0248528 A1 | 9/2014 | Takahata et al. |
| 2014/0287316 A1 | 9/2014 | Ahn et al. |
| 2015/0111102 A1 | 4/2015 | Ham et al. |
| 2015/0280221 A1 | 10/2015 | Abdelsalam et al. |
| 2016/0181612 A1 | 6/2016 | Lee et al. |

FOREIGN PATENT DOCUMENTS

| | | |
|---|---|---|
| CN | 102057524 A | 5/2011 |
| CN | 103843179 A | 6/2014 |
| DE | 10 2014 213 686 A1 | 1/2016 |
| JP | 3850977 B2 | 11/2006 |
| JP | 2009-64574 A | 3/2009 |
| JP | 5213015 B2 | 6/2013 |
| JP | 5278989 B2 | 9/2013 |

(Continued)

OTHER PUBLICATIONS

Chinese Office Action and Search Report for Chinese Application No. 201780007267.5, dated Nov. 25, 2020, with English translation of the Office Action.
International Search Report for PCT/KR2017/010697 mailed on Apr. 30, 2018.
Written Decision on Registration dated Mar. 26, 2019 for Korean Application No. 10-2017-0124177 with English translation.
Korean Intellectual Property Office Office Action dated Sep. 17, 2018 for Korean Application No. 10-2017-0124177 with English translation .

(Continued)

*Primary Examiner* — Stewart A Fraser
*Assistant Examiner* — Lilia Nedialkova
(74) *Attorney, Agent, or Firm* — Birch, Stewart, Kolasch & Birch, LLP

(57) ABSTRACT

The present disclosure relates to a multilayer negative electrode comprising a negative electrode current collector configured to transfer electrons between an outer lead and a negative electrode active material, a first negative electrode mixture layer formed on one surface or both surfaces of the current collector and containing natural graphite as a negative electrode active material and a second negative electrode mixture layer formed on the first negative electrode mixture layer and containing artificial graphite as a negative electrode active material, and a lithium secondary battery including the same.

18 Claims, No Drawings

(56) References Cited

FOREIGN PATENT DOCUMENTS

| | | |
|---|---|---|
| JP | 5787196 B2 | 9/2015 |
| KR | 10-2009-0111289 A | 10/2009 |
| KR | 10-2014-0044915 A | 4/2014 |
| KR | 10-2014-0095980 A | 8/2014 |
| KR | 10-2014-0099987 A | 8/2014 |
| KR | 10-2015-0073107 A | 6/2015 |
| WO | WO 2015-0938594 A1 | 6/2015 |

OTHER PUBLICATIONS

Korean Intellectual Property Office Written Opinion dated Nov. 16, 2018 for Korean Application No. 10-2017-0124177 with English translation.

European Notice of Opposition for European Application No. 17856722.8, dated Apr. 19, 2024.

\* cited by examiner

MULTI-LAYER NEGATIVE ELECTRODE COMPRISING NATURAL GRAPHITE AND ARTIFICIAL GRAPHITE AND LITHIUM SECONDARY BATTERY COMPRISING THE SAME

CROSS-REFERENCE TO RELATED APPLICATIONS

This application is a Continuation of U.S. application Ser. No. 16/063,837, filed on Jun. 19, 2018, which is the National Phase of PCT International Application No. PCT/KR2017/010697, filed on Sep. 27, 2017, which claim the priority benefit under 35 U.S.C. 119(a) to Patent Application Nos. 10-2017-0124177 filed on Sep. 26, 2017 and 10-2016-0125261 filed on Sep. 29, 2016, each filed in the Republic of Korea. All of the above applications are hereby incorporated by reference into the present application.

TECHNICAL FIELD

The present disclosure relates to a multi-layer negative electrode comprising a natural graphite and an artificial graphite and a lithium secondary battery comprising the same.

BACKGROUND ART

As the technical development of and the demand for mobile devices has increased, the demand for secondary batteries as energy sources has rapidly increased. Among such secondary batteries, lithium secondary batteries, which have high energy density, high operating voltage, a long cycle lifespan, and a low self-discharge rate, have been commercially available and widely used.

Recently, in line with growing concerns about environmental issues, research into electric vehicles (EVs), hybrid EVs (HEVs), and the like which are able to replace vehicles which use fossil fuels such as gasoline vehicles and diesel vehicles, which are one of major causes of air pollution, has been actively conducted. As a power source for EVs, HEVs, and the like, research on the lithium secondary batteries having high energy density, high discharge voltage, and output stability has been actively conducted, and some lithium secondary batteries have been used.

Accordingly, lithium secondary batteries have been developed to realize high voltage and high capacity in response to consumer demands. In order to realize the high capacity, a process of optimizing a positive electrode material, a negative electrode material, a separator and an electrolytic solution, which are four elements of the lithium secondary batteries within a limited space is required.

Generally, the easiest way to produce the required high capacity is manufacturing a high loaded electrode by disposing a large amount of electrode active material on a current collector. However, disposition of the electrode active material in this location may reduce battery performance and stability since electrode separation may occur during the coating, drying or rolling of the electrode when a certain level of electrode adhesion is not secured.

Therefore, research for a method for improving the electrode adhesion is actively conducted to manufacture a battery having improved performance and stability while realizing the high capacity. Currently, a method of incorporating a binder for improving the electrode adhesion and a conductive material for improving conductivity in the electrode is being widely used.

The electrode active material, the conductive material and the current collector constituting the electrode are solid at room temperature and have different surface characteristics and bonding is difficult at room temperature. However, bonding force between the elements of the electrode is increased when a polymeric binder is used. Accordingly, it is possible to suppress the phenomenon of electrode separation in the process of coating, drying and rolling the electrode, and also possible to increase the electronic conductivity and improve the output characteristic.

However, when the content of the binder is increased to improve the electrode adhesion, internal resistance of the electrode increases, electronic conductivity decreases, and the capacity also decreases. In other words, when the content of the conductive material is increased for improving the output characteristic, the adhesion is lowered and the amount of the active material is decreased and thus the capacity is decreased.

Further, in a process of drying a coated electrode, due to a temperature condition which is 'Tg or higher', the binder and the conductive material contained in a slurry state moves in a direction in which a solvent is volatilized (a direction away from the current collector), so that the adhesion between the current collector and the electrode mixture is further weakened.

Therefore, development of an electrode capable of improving overall performance of a battery by securing sufficient adhesion with a small amount of binder and conductive material while having high theoretical capacity and preventing deterioration of the output characteristic is much needed.

DISCLOSURE

Technical Problem

The present disclosure is provided to solve the above-described problems of the related art and technical problems which have been identified in the past.

The inventors of the present application have conducted intensive research and various experiments and have found that when natural graphite having excellent adhesion is contained as a negative electrode active material in an electrode mixture layer in contact with a current collector and artificial graphite having excellent output characteristics and lifespan characteristics is contained as a negative electrode active material in an electrode mixture layer on a surface side of an electrode, adhesion at an interface between the current collector and the electrode mixture layer is improved so that lifespan characteristics and output characteristics can be improved by the artificial graphite existing on the surface side of the electrode while sufficient adhesion between the current collector and the active material can be secured even with a binder having a small content similar to that of a conventional electrode, thereby preventing deterioration of overall battery performance, and thus completed the present invention.

Technical Solution

The present disclosure provides a multilayer negative electrode including a negative electrode current collector configured to transfer electrons between an outer lead and a negative electrode active material, a first negative electrode mixture layer formed on one surface or both surfaces of the current collector and containing natural graphite as a negative electrode active material, and a second negative electrode mixture layer formed on the first negative electrode mixture layer and containing artificial graphite as a negative electrode active material.

The present invention improves adhesion between a current collector and a negative electrode mixture layer, which have the greatest influence on adhesion of an electrode, by containing natural graphite having excellent adhesion in a first negative electrode mixture layer in contact with the current collector, and improves output characteristics and lifetime characteristics by containing a large amount of artificial graphite having a small change in volume during a cycle and excellent output characteristics and lifetime characteristics in a second negative electrode mixture layer on a surface side of the electrode.

The first negative electrode mixture layer may further contain artificial graphite, and the second negative electrode mixture layer may further contain natural graphite.

Since the artificial graphite has superior properties than natural graphite in the lifetime characteristics and output characteristics, an amount of the contained artificial graphite may be greater than an amount of the natural graphite on the basis of the overall negative electrode mixture layer, and the natural graphite may be contained in the negative electrode mixture layer in a portion in contact with the current collector in a certain range.

Although the first negative electrode mixture layer may contain only the natural graphite, the first negative electrode mixture layer may further contain the artificial graphite. In that case, in order to achieve a desired degree of adhesion with the current collector to the extent that the first negative electrode mixture layer further contains the artificial graphite, an amount of the contained natural graphite is preferably from 5 to 79% by weight based on the total weight of the first negative electrode mixture layer, is more preferably from 15 to 75% by weight, and is most preferably from 25 to 60% by weight.

When the first negative electrode mixture layer contains less than 5% by weight of the natural graphite outside of the above range, the amount of the natural graphite may be too small to exhibit sufficient adhesion with the current collector, which is not preferable. On the other hand, when the first negative electrode mixture layer contains more than 79% by weight of natural graphite exceeding the above range, it may not be preferable for lifetime characteristics and output characteristics of a battery.

Even though the second negative electrode mixture layer is also configured to further contain the natural graphite, since the artificial graphite exhibits better effects on lifetime characteristics and output characteristics than the natural graphite as described above, it is preferable for the second negative electrode mixture layer not in contact with the current collector to contain only a small amount of the natural graphite, and an amount of the natural graphite contained in the second negative electrode mixture layer may preferably be an amount of 0.1 to 10% by weight, and may more preferably be an amount of 0.1 to 5% by weight.

When the second negative electrode mixture layer contains a large amount of the natural graphite exceeding the above range, overall battery performance may be deteriorated.

In any of the above-described configurations, a total ratio of a material acting as a negative electrode active material in each of the negative electrode mixture layers may be from 80% by weight to 100% by weight, and may more specifically be from 80% by weight to 98% by weight based on the total weight of each of the negative electrode mixture layers.

A weight ratio of the first negative electrode mixture layer to the second negative electrode mixture layer may be 1:9 to 2:1, may preferably be 1:9 to 5:5, and may more preferably be 1:9 to 4:6.

This is because it is more preferable for a larger amount of the artificial graphite, which substantially improves performance of a battery of the present invention, to be contained in an entire negative electrode mixture layer while the natural graphite is only formed at a certain thickness in a region in contact with the current collector because the natural graphite affects adhesion.

Accordingly, the weight ratio of the first negative electrode mixture layer and the second negative electrode mixture layer may be determined by content of the natural graphite in the first negative electrode mixture layer. Specifically, when the first negative electrode mixture layer in contact with the current collector contains a large amount of the natural graphite, since an adhesive effect may be sufficiently exhibited even with a small amount, the weight ratio of the first negative electrode mixture layer to the total weight of the first negative electrode mixture layer and the second negative electrode mixture layer may be decreased as the content of the natural graphite of the first negative electrode mixture layer is increased.

When the first negative electrode mixture layer is applied to a thickness of less than 1/10 based on the weight of the entire negative electrode mixture layer outside of the above range, sufficient adhesion may not be exhibited, which is not preferable. When the first negative electrode mixture layer is applied to a thickness of greater than 2/3 based on the weight of the entire negative electrode mixture exceeding the above range, the natural graphite may occupy in an excessively large amount, and thus lifetime characteristics and output characteristics are remarkably deteriorated, which is also not preferable.

In one specific example, the natural graphite may have a specific surface area (BET) of 2 $m^2/g$ to 8 $m^2/g$, and may more specifically have a specific surface area of 2.1 $m^2/g$ to 4 $m^2/g$.

The specific surface area may be measured by the Brunauer-Emmett-Teller (BET) method. For example, the specific surface area may be measured by a 6-point BET method according to a nitrogen gas adsorption-flow method using a porosimetry analyzer (Belsorp-II mini by Bell Japan Inc.).

The larger the specific surface area of the natural graphite exhibiting excellent adhesion, the better. This is because, as the specific surface area is larger, the mechanical interlocking effect of inter particle adhesion the binder can be sufficiently secured. Therefore, when a specific surface area of the natural graphite is too small outside of the above range, sufficient adhesion may not be obtained, which is not preferable. When the specific surface area of the natural graphite is too large, initial irreversible capacity at a time of charging and discharging may be increased, which is also not preferable.

A shape of the natural graphite is not limited, and the natural graphite may be flake graphite, vein graphite, or amorphous graphite, may specifically be vein graphite or amorphous graphite, and may more specifically be amorphous graphite.

When a contact area between natural graphite particles becomes large, an adhesion area is increased, and thus adhesion is improved. Therefore, it is preferable for a tap density or a bulk density of the natural graphite to be large and for a degree of crystal grain orientation of the natural graphite to exhibit anisotropy. Thus, in order to improve the adhesion, which is the reason for containing the natural graphite, the natural graphite is most preferably amorphous graphite. The larger a tap density, the smaller an amount of solvent required for preparing slurry having the same viscosity, and thus a phenomenon of deterioration of adhesion due to binder movement during drying may be reduced.

Accordingly, the natural graphite according to the present invention may have a tap density of 0.9 g/cc to 1.3 g/cc, and the tap density may more specifically be 0.92 g/cc to 1.15 g/cc.

When the tap density is less than 0.9 g/cc outside of the above range, a contact area between particles may not be sufficient and characteristics of adhesion may be deteriorated, which is not preferable. When the tab density exceeds 1.3 g/cc exceeding the above range, there may be a problem that tortuosity of an electrode and wet-ability of an electrolyte are degraded so that the output characteristics during charging and discharging may be deteriorated, which is also not preferable.

The tap density is obtained by adding 50 g of a precursor to a 100 cc tapping cylinder using a SEISHIN (KYT-4000) measuring instrument using a JV-1000 measuring instrument manufactured by COPLEY Co., and then tapping the tapping cylinder 3,000 times.

As described above, as a degree of crystal grain orientation of the natural graphite has anisotropy, the shape of the natural graphite is easily deformed to obtain a wider contact area, and thus the natural graphite is not limited, but a ratio of $I_{110}$ to $I_{003}$ of particles of the natural graphite may be 20 to 40, and may more specifically be 20.5 to 36.0.

When a degree of orientation of the natural graphite is less than 20, a degree of orientation of crystal grains is disordered, and thus a shape change during a rolling process is small such that it is difficult to maximize the contact area with neighboring particles, which is not preferable.

When the degree of orientation of the natural graphite exceeds 40, a change in volume during charging and discharging is large, and thus lifetime characteristics and output characteristics may be deteriorated, which is also not preferable.

Here, the degree of orientation may be measured by XRD diffraction.

Specifically, 1003 is diffracted on a surface laminated in a C axis direction (longitudinal direction) of graphite, and the larger an amount of diffraction, the higher and wider a formed peak is. $I_{110}$ corresponds to an A-axis direction (lateral direction). At this time, a degree of orientation is evaluated by an area ratio of two peaks, and by $I_{002}$ or $I_{004}$ instead of $I_{003}$. Such a method for measuring a degree of orientation of graphite is well known in the art, and accordingly such known measurement methods may also be used in the present invention.

In one specific example, the natural graphite may have an average particle diameter (D50) of 5 μm to 30 μm, and the average particle diameter may specifically be 8 μm to 20 μm.

When the average particle diameter (D50) of spherical natural graphite is less than 5 μm, initial efficiency of a secondary battery may be decreased due to an increase of a specific surface area, and thus performance of a battery may be deteriorated. When the average particle diameter (D50) of the spherical natural graphite exceeds 30 μm, adhesion is deteriorated and a filling density is lowered, and thus capacity may be decreased.

The average particle diameter of the natural graphite may be measured using, for example, a laser diffraction method. In the laser diffraction method, particle diameters ranging from a submicron range to several millimeters can be measured, and high reproducibility and high resolvability may be obtained.

The average particle diameter (D50) of the natural graphite may be defined as a particle diameter based on 50% of a particle diameter distribution.

The average particle diameter (D50) of the natural graphite is measured, for example, by dispersing the natural graphite in a solution of ethanol/water, and introducing the dispersed natural graphite into a commercially available laser diffraction particle diameter analyzer (for example Microtrac MT 3000), then emitting an ultrasonic wave of about 28 kHz toward the dispersed natural graphite at an output of 60 W, and calculating the average particle diameter (D50) based on 50% of a particle diameter distribution in the measuring apparatus.

Natural graphite which satisfies the above average particle diameter range of the natural graphite may be obtained by introducing particles of the natural graphite into a sphering device (Nara Hybridization System, NHS-2), and sphering the particles of the natural graphite at a rotor speed of about 30 to 100 m/sec for about 10 to 30 minutes, but the present invention is not limited thereto.

On the other hand, the artificial graphite contained in the multilayered negative electrode of the present invention may be 0.5 $m^2$/g to 5 $m^2$/g, and more specifically 0.6 $m^2$/g to 4 $m^2$/g, in a range in which a specific surface area (BET) of the artificial graphite is smaller than that of the natural graphite.

When an amount of the artificial graphite is too small outside of the above range, adhesion is remarkably lowered and output characteristics at a time of charging and discharging are deteriorated, which is not preferable. When the amount of artificial graphite is too large, initial efficiency of a secondary battery is decreased due to an increase in specific surface area, which is also not preferable.

The artificial graphite is not limited and may be in a form of a powder, a flake, a block, a plate, or a rod. Specifically, the artificial graphite may be in a form of a flake or a plate and more particularly in a flake because it is preferable for a moving distance of lithium ions to be shorter in order to exhibit the most excellent output characteristics and it is preferable for a degree of crystal grain orientation of the artificial graphite to exhibit isotropy in order to shorten a moving distance to an electrode direction.

Accordingly, particles of the artificial graphite may have a ratio of $I_{110}$ to $I_{003}$ of particles of 5 to 20, and may specifically have a ratio of 7 to 19.

When the degree of orientation of the artificial graphite is less than 5, there is a large amount of voids in the particles, and thus capacity per volume may be decreased and irreversible capacity may be increased, which is not preferable. When the degree of orientation of the artificial graphite is more than 20, a change in volume during charging and discharging becomes large and lifetime characteristics may be deteriorated, which is also not preferable.

A tap density of the artificial graphite may be 0.7 g/cc to 1.1 g/cc, and may specifically be 0.8 g/cc to 1.05 g/cc.

When the tap density is less than 0.7 g/cc outside of the above range, a contact area between particles is not sufficient, characteristics of adhesion are deteriorated, and capacity per volume is decreased, which is not preferable. When the tab density exceeds 1.1 g/cc exceeding the above range, there is a problem that tortuosity of an electrode and wet-ability of an electrolyte are degraded and output characteristics during charging and discharging are deteriorated, which is also not preferable.

The artificial graphite may have an average particle diameter (D50) of 8 to 30 μm, and more specifically of 12 to 25 μm.

When the average particle diameter (D50) of the artificial graphite is less than 8 μm, initial efficiency of a secondary battery may be decreased due to an increase of a specific surface area, and thus performance of a battery may be deteriorated. When the average particle diameter (D50) of the spherical natural graphite exceeds 30 μm, adhesion is deteriorated and a filling density is lowered, and thus capacity may be decreased.

On the other hand, at least one of the natural graphite and the artificial graphite may be pitch-coated, and specifically, the natural graphite may be pitch-coated.

Pitch is prepared by distilling oil or crude oil obtained from a liquid substance, an oil sand, an oil sell, or the like, which is produced during a drying process of wood and coal, or by heat-treating and polymerizing pyrolysis residue and the like, and a solid state material at room temperature. Here, the pitch serves as a soft carbon, and has a crystallinity even at a high temperature of 1,000 to 2,000. Thus, when the graphite coated with such a pitch is used, battery performance such as lifetime characteristics may be further improved.

In one specific example, a first negative electrode mixture layer and a second negative electrode mixture layer of a negative electrode prepared with a multi-layer structure may not be mixed, but a boundary surface may be formed therebetween, or some of solid contents of the respective layers may be mixed therebetween so as not to form the boundary surface.

The formation of the interface is determined according to how a negative electrode having a multi-layer structure is manufactured. For example, in a case of applying a second negative electrode slurry forming a second negative electrode mixture layer after a first negative electrode slurry forming a first negative electrode mixture layer is applied and dried, the first negative electrode mixture layer and the second negative electrode mixture layer are not mixed and a boundary surface may be formed therebetween. When the second negative electrode slurry is applied before the first negative electrode slurry is applied and dried, solid contents thereof are mixed at the interface thereof and the boundary surface is not formed.

Accordingly, the constitution of a negative electrode is suitably selected in consideration of advantages and disadvantages of each constitution, but it is more preferable for the second negative electrode slurry to be applied before the first negative electrode slurry is applied and dried in terms of overall characteristics.

Each of the first negative electrode mixture layer and the second negative electrode mixture layer may further include a binder and a conductive material in addition to an active material.

The binder is a component configured to assist in bonding an active material to a conductive material, and is generally contained in an amount of 1 to 10 wt % based on the total weight of a negative electrode mixture layer. Here, it is more preferable for a content of the binder contained in the first negative mixture layer to be greater than the content of the binder contained in the second negative mixture layer in terms of adhesion of an electrode. When the content of the binder is less than 1% by weight outside of the above range, a desired level of adhesion may not be obtained, which is not preferable. When the content of the binder exceeds 10% by weight exceeding the above range, the content of the active material may be relatively decreased and the capacity may be decreased, which is also not preferable.

Here, types of binders contained in each of the negative electrode mixture layers may be the same or different, but the binders are preferably the same type in terms of ease of manufacture and mutual adhesion of the negative electrode mixture layers.

For examples, the binder may be selected from polyvinylidene fluoride (PVdF), polyvinyl alcohol, carboxymethylcellulose (CMC), starch, hydroxypropylcellulose, regenerated cellulose, polyvinyl pyrollidone, tetrafluoroethylene, polyethylene, polypropylene, ethylene-propylene-diene terpolymer (EPDM), sulfonated EPDM, styrene butadiene rubber, fluoro rubber, and various copolymers.

The conductive material may be included for a purpose of improving electronic conductivity, and is usually added in an amount of about 1 to 10 wt % based on a total weight of the negative electrode mixture layer.

When the content of the conductive material is less than 1 wt %, the desired electrical conductivity may be not obtained, and when the content of the conductive material is more than 10 wt %, a content of the active material, etc. decreases relatively and thus capacity decreases.

The conductive agent is not particularly restricted so long as the conductive agent exhibits high conductivity while the conductive agent does not induce any chemical change in the battery to which it is applied. For example, graphite, such as natural graphite or artificial graphite; carbon black, such as carbon black, acetylene black, Ketjen black, channel black, furnace black, lamp black, or summer black; conductive fiber, such as carbon fiber or metallic fiber; metallic powder, such as carbon fluoride powder, aluminum powder, or nickel powder; conductive whisker, such as zinc oxide or potassium titanate; conductive metal oxide, such as titanium oxide; or polyphenylene derivatives may be used as the conductive agent.

In particular, as with the binder, types of the conductive materials contained in each of the negative electrode mixture layers may be the same or different.

Also, the first negative electrode mixture layer and the second negative electrode mixture layer may further include a filler as the case may be.

The filler is an optional component used to inhibit expansion of the electrode. There is no particular limit to the filler so long as it does not cause chemical changes in the battery to which it is applied and is made of a fibrous material. As examples of the filler, there may be used olefin polymers, such as polyethylene and polypropylene; and fibrous materials, such as glass fiber and carbon fiber.

Also, types of the filler contained in each of the negative electrode mixture layers may be the same or different.

The negative electrode current collector may be generally manufactured to a thickness of about 3 to 500 m. For the negative electrode current collector, a material not inducing chemical change and having conductivity may be used without limitation. For example, copper, stainless steel, aluminum, nickel, titanium, calcined carbon, a surface treated material of copper or stainless steel with carbon, nickel, titanium, silver, an aluminum-cadmium alloy, etc. may be used. Also, to increase the adhesiveness of the negative electrode active material, minute embossing may be formed on the surface of the negative electrode current collector. The negative electrode current collector may have various shapes such as a film, a sheet, a foil, a net, a porous body, a foamed body, a non-woven fabric, etc.

The present disclosure also provides a lithium secondary battery including the multilayer negative electrode.

The lithium secondary battery has a structure in which a non-aqueous electrolyte containing a lithium salt is impregnated in an electrode assembly including the multilayer negative electrode, the positive electrode and a separator interposed between the multilayer negative electrode and the positive electrode.

The positive electrode is prepared, for example, by coating a positive electrode mixture including a positive electrode active material on a positive electrode current collector, and a binder, a conductive material and a filler may be further added as necessary.

The positive electrode current collector may be generally manufactured to a thickness of about 3 to 500 µm. For the positive electrode current collector, a material not inducing the chemical change and having a high conductivity may be used without limitation. For example, stainless steel, aluminum, nickel, titanium, calcined carbon, a surface treated material of aluminum or stainless steel with carbon, nickel, titanium, silver, or the like may be typically used. To increase the adhesiveness of the positive electrode active material, minute embossing may be formed on the surface of the positive electrode current collector. In addition, the positive electrode current collector may have various shapes such as a film, a sheet, a foil, a net, a porous body, a foamed body, a non-woven fabric, etc.

The positive electrode active material may include, for example, a layered compound of lithium cobalt oxide ($LiCoO_2$), lithium nickel oxide ($LiNiO_2$), etc. or a substituted compound with one or more transition metals; lithium manganese oxide such as $Li_{1+x}Mn_{2-x}O_4$ (in which x is 0 to 0.33), $LiMnO_3$, $LiMn_2O_3$, $LiMnO_2$, etc.; lithium copper oxide ($Li_2CuO_2$); vanadium oxide such as $LiV_3O_8$, $LiFe_3O_4$, $V_2O_5$, $Cu_2V_2O_7$, etc.; Ni site-type lithium nickel oxide represented by Chemical Formula of $LiNi_{1-x}M_xO_2$ (in which, M=Co, Mn, Al, Cu, Fe, Mg, B or Ga, x=0.01 to 0.3); lithium manganese complex oxide represented by Chemical Formula $LiMn_{2-x}M_xO_2$ (in which M=Co, Ni, Fe, Cr, Zn or Ta, and x=0.01 to 0.1) or $Li_2Mn_3MO_8$ (in which, M=Fe, Co, Ni, Cu or Zn); spinel-structured lithium manganese composite oxide represented by $LiNi_xMn_{2-x}O_4$; $LiMn_2O_4$ in which a portion of Li is substituted with alkaline earth metal ions; a disulfide compound; $Fe_2(MoO_4)_3$, and the like. However, the present disclosure may not be limited thereof.

The separator is an insulating thin film having high ion permeability and mechanical strength is used. A pore diameter of the separator is generally 0.01 to 10 µm, and a thickness thereof is generally 5 to 300 m. For example, there may be used olefin-based polymers such as polypropylene, which is chemically resistant and hydrophobic; a sheet or a non-woven fabric made of glass fiber, polyethylene or the like may be used as an example of the separator. When a solid electrolyte such as a polymer is used as the electrolyte, the solid electrolyte may also serve as a separator.

The non-aqueous electrolyte containing a lithium salt may include a non-aqueous electrolytic solution and a lithium salt. Examples of the non-aqueous electrolytic solution may include non-aqueous organic solvent, organic solid electrolyte, inorganic solid electrolyte, etc., but may not be limited thereof.

As examples of the non-aqueous organic solvent, mention may be made of non-protic organic solvents, such as N-methyl-2-pyrollidinone, propylene carbonate, ethylene carbonate, butylene carbonate, dimethyl carbonate, diethyl carbonate, gamma-butyro lactone, 1,2-dimethoxy ethane, tetrahydroxy Franc, 2-methyl tetrahydrofuran, dimethyl-sulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, and ethyl propionate.

As examples of the organic solid electrolyte, mention may be made of polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.

As examples of the inorganic solid electrolyte, mention may be made of nitrides, halides, and sulphates of lithium (Li), such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$, and $Li_3PO_4$—$Li_2S$—$SiS_2$.

The lithium salt is a material that is readily soluble in the above-mentioned non-aqueous electrolyte, and may include, for example, LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $(CF_3SO_2)_2NLi$, chloroborane lithium, lower aliphatic carboxylic acid lithium, lithium tetraphenyl borate, and imide.

In addition, in order to improve charge and discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride, or the like may be added to the non-aqueous electrolyte containing a lithium salt. According to circumstances, in order to impart incombustibility, the non-aqueous electrolyte containing a lithium salt may further include halogen-containing solvents, such as carbon tetrachloride and ethylene trifluoride. Furthermore, in order to improve high-temperature storage characteristics, the non-aqueous electrolyte containing a lithium salt may further include carbon dioxide gas, and may further include fluoro-ethylene carbonate (FEC), propene sultone (PRS), etc.

In one specific example, an electrolytic solution may be prepared by adding a lithium salt such as $LiPF_6$, $LiClO_4$, $LiBF_4$, $LiN(SO_2CF_3)_2$, etc. to a mixed solvent of a cyclic carbonate of EC or PC, which is a high-dielectric solvent, and a linear carbonate of DEC, DMC or EMC, which is a low viscosity solvent.

The present disclosure provides a battery module or a battery pack including the lithium secondary battery as a unit battery, and a device including the same as a power source.

Specific examples of the device include an electric vehicle including an electric vehicle (EV), a hybrid electric vehicle (HEV), a plug-in hybrid electric vehicle (PHEV), etc., power storage systems and etc., but the present disclosure is not limited thereto.

In addition, a structure of the battery module and the battery pack and a method of manufacturing thereof, and a structure of the devices and a method of manufacturing thereof are well known in the art, so a description thereof will be omitted in the present disclosure.

Advantageous Effects

As described above, a multilayer negative electrode according to the present invention can improve adhesion at an interface between a current collector and an electrode mixture layer by containing natural graphite having excellent adhesion in the electrode mixture layer in contact with the current collector as a negative electrode active material, and artificial graphite having excellent output characteristics and lifespan characteristics in the electrode mixture layer on a surface side of an electrode as a negative electrode active material, and thus lifespan characteristics and output characteristics can be improved by the artificial graphite existing on the surface side of the electrode while sufficient adhesion between the current collector and the active material can be secured even with a binder having a small content similar to that of a conventional electrode.

DETAILED DESCRIPTION OF THE PREFERRED EMBODIMENTS

Hereinafter, the present invention will be described in detail with reference to the following examples. However, these are provided as preferable examples of the present invention, and do not limit the scope of the present invention in any respect.

Example 1

1-1. Preparing of First Negative Electrode Slurry

Natural graphite in an amorphous form (a specific surface area: 3.0 $m^2/g$, a tap density: 0.95 g/cc, a degree of orientation: 25) having an average particle diameter D50 of 11 μm used as a first negative electrode active material, SBR used as a binder, CMC used as a thickener, and carbon black used as a conductive material were weighed to have a weight ratio of 94:2.5:2:1.5, and then placed in distilled water and mixed to prepare a first negative electrode slurry.

1-2. Preparing of Second Negative Electrode Slurry

Artificial graphite in a flake form (a specific surface area: 1.5 $m^2/g$, a tap density: 0.9 g cc, a degree of orientation: 12) having an average particle diameter D50 of 20.8 μm used as a second negative electrode active material, SBR used as a binder, CMC used as a thickener, and carbon black used as a conductive material were weighed to have a weight ratio 94:2.5:2:1.5, and then placed in distilled water and mixed to prepare a second negative electrode slurry.

1-3. Preparing of a Negative Electrode

The first negative electrode slurry was applied to a copper foil current collector at a loading amount of 6 mg/$cm^2$ (based on a post-drying amount), and the second negative electrode slurry was applied to the first negative electrode slurry at a loading amount of 10 mg/$cm^2$ and dried, and then they were rolled so that a density of an electrode was 1.6 g/cc to prepare a negative electrode.

Example 2

A negative electrode was prepared in the same manner as in Example 1, except that natural graphite in an amorphous form (a specific surface area: 3.5 $m^2/g$, a tap density: 1.00 g/cc, a degree of orientation: 28) having an average particle diameter D50 of 15 μm was used as a first negative electrode active material.

Example 3

A negative electrode was prepared in the same manner as in Example 1, except that natural graphite in an amorphous form (a specific surface area: 3.0 $m^2/g$, a tap density: 0.95 g/cc, a degree of orientation: 25) having an average particle diameter D50 of 11 μm and artificial graphite in a flake form (a specific surface area: 1.5 $m^2/g$, a tap density: 0.9 g cc, a degree of orientation: 12) having an average particle diameter D50 of 20.8 μm were mixed at a weight ratio of 3:7 as a first negative electrode active material.

Example 4

A negative electrode was prepared in the same manner as in Example 3, except that the first negative electrode slurry was applied to a copper foil current collector at a loading amount of 6 mg/$cm^2$ (based on a post-drying amount) and dried, and the second negative electrode slurry was applied to the first negative electrode slurry at a loading amount of 10 mg/$cm^2$ and dried, and then they were rolled so that a density of an electrode was 1.6 g/cc to prepare a negative electrode.

Example 5

A negative electrode was prepared in the same manner as in Example 1, except that natural graphite in an amorphous form (a specific surface area: 2.2 $m^2/g$, a tap density: 0.94 g/cc, a degree of orientation: 22) having an average particle diameter D50 of 11 μm and artificial graphite in a flake form (a specific surface area: 1.5 $m^2/g$, a tap density: 0.9 g cc, a degree of orientation: 12) having an average particle diameter D50 of 20.8 μm were mixed at a weight ratio of 3:7 as a first negative electrode active material.

Example 6

A negative electrode was prepared in the same manner as in Example 1, except that natural graphite in an amorphous form (a specific surface area: 6.0 $m^2/g$, a tap density: 0.85 g/cc, a degree of orientation: 20) having an average particle diameter D50 of 4 μm and artificial graphite in a flake form (a specific surface area: 1.5 $m^2/g$, a tap density: 0.9 g cc, a degree of orientation: 12) having an average particle diameter D50 of 20.8 μm were mixed at a weight ratio of 3:7 as a first negative electrode active material.

Example 7

A negative electrode was prepared in the same manner as in Example 1, except that natural graphite in an amorphous form (a specific surface area: 3.0 $m^2/g$, a tap density: 0.95 g/cc, a degree of orientation: 25) having an average particle diameter D50 of 11 μm and artificial graphite in a flake form (a specific surface area: 1.5 $m^2/g$, a tap density: 0.9 g cc, a degree of orientation: 12) having an average particle diameter D50 of 20.8 μm were mixed at a weight ratio of 1.8:8.2 as a first negative electrode active material, and the first negative electrode slurry was applied to a copper foil current collector at a loading amount of 10 mg/$cm^2$ (based on a post-drying amount), and the second negative electrode slurry was applied to the first negative electrode slurry at a loading amount of 6 mg/$cm^2$ and dried.

Example 8

A negative electrode was prepared in the same manner as in Example 3, except that the first negative electrode slurry was applied to a copper foil current collector at a loading amount of 10 mg/$cm^2$ (based on a post-drying amount), and the second negative electrode slurry was applied to the first negative electrode slurry at a loading amount of 6 mg/$cm^2$ and dried, and then they were rolled so that a density of an electrode was 1.6 g/cc to prepare a negative electrode.

Example 9

A negative electrode was prepared in the same manner as in Example 1, except that natural graphite in an amorphous form (a specific surface area: 3.0 m$^2$/g, a tap density: 0.95 g/cc, a degree of orientation: 25) having an average particle diameter D50 of 11 μm and artificial graphite in a flake form (a specific surface area: 1.5 m$^2$/g, a tap density: 0.9 g cc, a degree of orientation: 12) having an average particle diameter D50 of 20.8 μm were mixed at a weight ratio of 1:9 as a first negative electrode active material, and the first negative electrode slurry was applied to a copper foil current collector at a loading amount of 6 mg/cm$^2$ (based on a post-drying amount), and the second negative electrode slurry was applied to the first negative electrode slurry at a loading amount of 10 mg/cm$^2$ and dried.

Example 10

A negative electrode was prepared in the same manner as in Example 1, except that natural graphite in an amorphous form (a specific surface area: 3.0 m$^2$/g, a tap density: 0.95 g/cc, a degree of orientation: 25) having an average particle diameter D50 of 11 μm and artificial graphite in a flake form (a specific surface area: 1.5 m$^2$/g, a tap density: 0.9 g cc, a degree of orientation: 12) having an average particle diameter D50 of 20.8 μm were mixed at a weight ratio of 4:6 as a first negative electrode active material, and the first negative electrode slurry was applied to a copper foil current collector at a loading amount of 6 mg/cm$^2$ (based on a post-drying amount), and the second negative electrode slurry was applied to the first negative electrode slurry at a loading amount of 10 mg/cm$^2$ and dried.

Example 11

A negative electrode was prepared in the same manner as in Example 1, except that natural graphite in an amorphous form (a specific surface area: 3.0 m$^2$/g, a tap density: 0.95 g/cc, a degree of orientation: 25) having an average particle diameter D50 of 11 μm and artificial graphite in a flake form (a specific surface area: 1.5 m$^2$/g, a tap density: 0.9 g cc, a degree of orientation: 12) having an average particle diameter D50 of 20.8 μm were mixed at a weight ratio of 1:1 as a first negative electrode active material, and the first negative electrode slurry was applied to a copper foil current collector at a loading amount of 6 mg/cm$^2$ (based on a post-drying amount), and the second negative electrode slurry was applied to the first negative electrode slurry at a loading amount of 10 mg/cm$^2$ and dried.

Example 12

A negative electrode was prepared in the same manner as in Example 1, except that natural graphite in an amorphous form (a specific surface area: 3.0 m$^2$/g, a tap density: 0.95 g/cc, a degree of orientation: 25) having an average particle diameter D50 of 11 μm and artificial graphite in a flake form (a specific surface area: 1.5 m$^2$/g, a tap density: 0.9 g cc, a degree of orientation: 12) having an average particle diameter D50 of 20.8 μm were mixed at a weight ratio of 6:4 as a first negative electrode active material, and the first negative electrode slurry was applied to a copper foil current collector at a loading amount of 6 mg/cm$^2$ (based on a post-drying amount), and the second negative electrode slurry was applied to the first negative electrode slurry at a loading amount of 10 mg/cm$^2$ and dried.

Example 13

A negative electrode was prepared in the same manner as in Example 1, except that natural graphite in an amorphous form (a specific surface area: 3.0 m$^2$/g, a tap density: 0.95 g/cc, a degree of orientation: 25) having an average particle diameter D50 of 11 μm and artificial graphite in a flake form (a specific surface area: 1.5 m$^2$/g, a tap density: 0.9 g cc, a degree of orientation: 12) having an average particle diameter D50 of 20.8 μm were mixed at a weight ratio of 7:3 as a first negative electrode active material, and the first negative electrode slurry was applied to a copper foil current collector at a loading amount of 6 mg/cm$^2$ (based on a post-drying amount), and the second negative electrode slurry was applied to the first negative electrode slurry at a loading amount of 10 mg/cm$^2$ and dried.

Example 14

A negative electrode was prepared in the same manner as in Example 1, except that natural graphite in an amorphous form (a specific surface area: 3.0 m$^2$/g, a tap density: 0.95 g/cc, a degree of orientation: 25) having an average particle diameter D50 of 11 μm and artificial graphite in a flake form (a specific surface area: 1.5 m$^2$/g, a tap density: 0.9 g cc, a degree of orientation: 12) having an average particle diameter D50 of 20.8 μm were mixed at a weight ratio of 8:2 as a first negative electrode active material, and the first negative electrode slurry was applied to a copper foil current collector at a loading amount of 6 mg/cm$^2$ (based on a post-drying amount), and the second negative electrode slurry was applied to the first negative electrode slurry at a loading amount of 10 mg/cm$^2$ and dried.

Example 15

A negative electrode was prepared in the same manner as in Example 1, except that natural graphite in an amorphous form (a specific surface area: 3.0 m$^2$/g, a tap density: 0.95 g/cc, a degree of orientation: 25) having an average particle diameter D50 of 11 μm and artificial graphite in a flake form (a specific surface area: 1.5 m$^2$/g, a tap density: 0.9 g cc, a degree of orientation: 12) having an average particle diameter D50 of 20.8 μm were mixed at a weight ratio of 3:7 as a first negative electrode active material, and the first negative electrode slurry was applied to a copper foil current collector at a loading amount of 8 mg/cm$^2$ (based on a post-drying amount), and the second negative electrode slurry was applied to the first negative electrode slurry at a loading amount of 8 mg/cm$^2$ and dried.

Example 16

A negative electrode was prepared in the same manner as in Example 1, except that natural graphite in an amorphous form (a specific surface area: 3.0 m$^2$/g, a tap density: 0.95 g/cc, a degree of orientation: 25) having an average particle diameter D50 of 11 μm and artificial graphite in a flake form (a specific surface area: 1.5 m$^2$/g, a tap density: 0.9 g cc, a degree of orientation: 12) having an average particle diameter D50 of 20.8 μm were mixed at a weight ratio of 3:7 as a first negative electrode active material, and the first negative electrode slurry was applied to a copper foil current collector at a loading amount of 8 mg/cm² (based on a post-drying amount), and the second negative electrode slurry was applied to the first negative electrode slurry at a loading amount of 8 mg/cm² and dried.

Comparative Example 1

A negative electrode was prepared in the same manner as in Example 1, except that artificial graphite in a flake form (a specific surface area: 1.5 m²/g, a tap density: 0.9 g cc, a degree of orientation: 12) having an average particle diameter D50 of 20.8 μm was used as a first negative electrode active material, and amorphous graphite (a specific surface area: 3.0 m²/g, a tap density: 0.95 g/cc, a degree of orientation: 25) having an average particle diameter D50 of 11 μm and artificial graphite in a flake form (a specific surface area: 1.5 m²/g, a tap density: 0.9 g cc, a degree of orientation: 12) having an average particle diameter D50 of 20.8 μm were mixed at a weight ratio of 3:7 as a second negative electrode active material.

Comparative Example 2

A negative electrode was prepared in the same manner as in Comparative Example 1, except that the first negative electrode slurry was applied to a copper foil current collector at a loading amount of 10 mg/cm² (based on a post-drying amount), and the second negative electrode slurry was applied to the first negative electrode slurry at a loading amount of 6 mg/cm² and dried, and then they were rolled so that a density of an electrode was 1.6 g/cc to prepare a negative electrode.

Comparative Example 3

A negative electrode was prepared in the same manner as in Comparative Example 1, except that natural graphite in an amorphous form (a specific surface area: 3.0 m²/g, a tap density: 0.95 g/cc, a degree of orientation: 25) having an average particle diameter D50 of 11 μm and artificial graphite in a flake form (a specific surface area: 1.5 m²/g, a tap density: 0.9 g cc, a degree of orientation: 12) having an average particle diameter D50 of 20.8 μm were mixed at a weight ratio of 5:95 as a first negative electrode active material.

Comparative Example 4

Using a mixture obtained by mixing natural graphite in an amorphous form (a specific surface area: 3.0 m²/g, a tap density: 0.95 g/cc, a degree of orientation: 25) having an average particle diameter D50 of 11 μm and artificial graphite in a flake form (a specific surface area: 1.5 m²/g, a tap density: 0.9 g cc, a degree of orientation: 12) having an average particle diameter D50 of 20.8 μm at a weight ratio of 11:89 as a negative electrode active material, SBR as a binder, CMC as a thickener and carbon black as a conductive material, negative electrode active material:binder:thickener:conductive material were mixed with distilled water at a ratio of 94:2.5:2:1.5 to prepare a negative electrode slurry.

The negative electrode slurry was applied to a copper foil current collector at a loading amount of 16 mg/cm² (based on a post-drying amount) and dried, and then they were rolled so that a density of an electrode was 1.6 g/cc to prepare a negative electrode.

Comparative Example 5

A negative electrode was prepared in the same manner as in Example 1, except that only the second negative electrode slurry was applied to a copper foil current collector at a loading amount of 16 mg/cm² (based on a post-drying amount), and then they were rolled so that a density of an electrode was 1.6 g/cc to prepare a negative electrode.

Comparative Example 6

A negative electrode was prepared in the same manner as in Example 1, except that only the first negative electrode slurry was applied to a copper foil current collector at a loading amount of 16 mg/cm² (based on a post-drying amount), and then they were rolled so that a density of an electrode was 1.6 g/cc to prepare a negative electrode.

Experimental Example 1

The negative electrode plates prepared in Examples 1 to 9 and Comparative Examples 1 to 5 were cut to have a width of 15 mm and fixed on a slide glass, and then the current collector was peeled off at a rate of 300 mm/min to measure a 180 degree peel strength, the results of which are shown in Table 1 below.

Experimental Example 2

$Li(Ni_{1/3}Co_{1/3}Mn_{1/3})O_2$ used as a positive electrode active material was placed in distilled water with carbon black and PVDF at a ratio of 96:2:2 and mixed to prepare a positive electrode slurry. The prepared positive electrode slurry was applied to an aluminum foil current collector at a loading amount of 29.2 mg/cm² (based on a post-drying amount) and dried, and then rolled at an electrode density of 3.4 g/cc to prepare a positive electrode.

The prepared positive electrode was punched to a size of 3×4 cm, and the negative electrodes prepared in Examples 1 to 9 and Comparative Examples 1 to 5 were punched to a size of 3.2×4.2 cm. Afterward, a PE separator was interposed between the positive electrode and the negative electrode, and pouch cells were prepared by sealing an electrolyte containing 1 M of $LiPF_6$ in a solvent of EC:DMC:DEC=1:2:1 with an aluminum pouch.

The cells were charged and discharged (3.0 V) for 50 cycles in a 1 C CC/CV mode at an ambient temperature of 25° C. and an upper limit voltage of 4.25 V, and a capacity retention ratio was measured. The results are shown in Table 1 below.

Discharge resistance was calculated from a voltage of the cell after charging the cell in a 1 C CC/CV mode at 4.55 V and applying a current corresponding to 2.5 C for 30 seconds at SOC 50, and the discharge resistances are shown in Table 1 below.

TABLE 1

|  | Adhesion (gf/15 mm) | Capacity Retention Ratio (%) | Discharge Resistance @ SOC 50% |
|---|---|---|---|
| Example 1 | 62 | 91.1 | 1.371 |
| Example 2 | 64 | 90.8 | 1.382 |
| Example 3 | 54 | 99.1 | 1.330 |
| Example 4 | 36 | 91 | 1.341 |
| Example 5 | 47 | 99.2 | 1.352 |
| Example 6 | 27 | 97.5 | 1.324 |
| Example 7 | 18 | 93.1 | 1.329 |
| Example 8 | 47 | 91.3 | 1.366 |
| Example 9 | 17.5 | 99.3 | 1.320 |
| Example 10 | 54.5 | 98.4 | 1.354 |
| Example 11 | 56 | 97.9 | 1.371 |

TABLE 1-continued

| | Adhesion (gf/15 mm) | Capacity Retention Ratio (%) | Discharge Resistance @ SOC 50% |
|---|---|---|---|
| Example 12 | 57 | 96.2 | 1.384 |
| Example 13 | 59 | 94.3 | 1.398 |
| Example 14 | 61 | 90.1 | 1.421 |
| Example 15 | 49 | 98.9 | 1.361 |
| Example 16 | 66 | 92.4 | 1.382 |
| Comparative Example 1 | 9 | 88.2 | 1.411 |
| Comparative Example 2 | 11 | 89.3 | 1.432 |
| Comparative Example 3 | 12 | 99.4 | 1.318 |
| Comparative Example 4 | 15 | 99.1 | 1.393 |
| Comparative Example 5 | 7 | 96.3 | 1.311 |
| Comparative Example 6 | 48 | 84.2 | 1.486 |

Hereinafter, Table 1 and Experimental Examples 1 and 2 will be described together.

First, referring to Examples 3 to 7 and Comparative Examples 2 and 4, or Examples 8 and 11 and Comparative Example 1 in which an overall negative electrode contains similar amounts of artificial graphite and natural graphite, it can be seen that when an active material in a form of a mixture of artificial graphite and natural graphite is coated with a two-layer structure to be positioned close to a current collector and a first negative electrode mixture layer contains the active material (Examples 3 to 7 and Example 8, Example 11) as in the present invention, adhesion, a capacity retention rate and discharge resistance characteristics (output characteristics) are superior to those of Comparative Example 1 or 2 in which only the artificial graphite was contained in the first negative electrode mixture layer or Comparative Example 4 in which a content of natural graphite located near the current collector is relatively small because the content of the natural graphite contained in the overall electrode is great and widely spread as the active material is coated with a single layer even when the mixed form of the active material is used.

Comparing Example 3 and Example 8 having the same configurations but differing amounts of loading of the first negative mixture layer and of the second negative mixture layer, it can be seen that superior adhesion, capacity retention ratio, and output characteristics are exhibited when the first negative electrode mixture layer is applied in a smaller amount than the second negative electrode mixture layer (Example 3).

Comparing Example 3 and Examples 9 to 14 in which contents of the natural graphite contained in the first negative mixture layer are different, it can be seen that the capacity retention ratio and discharge resistance are similar and the adhesion is remarkably excellent in a case in which natural graphite and artificial graphite are mixed at a weight ratio of 3:7 or more in the first negative electrode mixture layer (Example 3, Examples 10 to 14) in comparison to a case in which natural graphite and artificial graphite were mixed at 1:9 (Example 9).

Comparing Examples 3, 5, and 6 in which types of natural graphite were different, it can be seen that the adhesion and capacity retention rates of Examples 3 and 5 satisfying the particle diameter and tap density of the present invention are better than those of Example 6 in which the particle diameter and tap density of the present invention are different.

Comparing Example 3 and Example 4 in which the coating methods of the first negative electrode slurry and the second negative electrode slurry were different, it can be seen that the coating of the second negative electrode slurry before drying after the coating of the first negative electrode slurry is superior in all the properties.

In conclusion, when the above results are examined as a whole, it can be seen that the most excellent performance of a battery in terms of adhesive force, capacity retention ratio, and output characteristics is obtained in a case in which natural graphite is contained in a first negative electrode slurry at a weight ratio of 3:7 or more in comparison to artificial graphite, a loading amount of the first negative electrode slurry is made smaller than a loading amount of a second negative electrode slurry, and a wetting electrode coating is performed when preparing a negative electrode in a multilayer structure.

Comparative Example 5 using only artificial graphite and Comparative Example 6 using only natural graphite have a problem in that adhesion is very low (Comparative Example 5) and capacity retention and output characteristics are very poor (Comparative Example 6).

It should be understood by those skilled in the art that various changes may be made without departing from the spirit and scope of the present disclosure.

The invention claimed is:

1. A multilayer negative electrode comprising:
    a negative electrode current collector configured to transfer electrons between an outer lead and a negative electrode active material;
    a first negative electrode mixture layer formed on one surface or both surfaces of the current collector and comprising natural graphite and artificial graphite as a negative electrode active material; and
    a second negative electrode mixture layer formed on the first negative electrode mixture layer and comprising a negative electrode active material consisting of artificial graphite,
    wherein an amount of the natural graphite present in the first negative electrode mixture layer is from 15% by weight to 75% by weight based on a total weight of the first negative electrode mixture layer,
    wherein a weight ratio of the first negative electrode mixture layer to the second negative electrode mixture layer is 1:9 to 5:5, and
    wherein an amount of the artificial graphite is greater than an amount of the natural graphite based on a total amount of the first negative electrode mixture layer and second negative electrode mixture layer.

2. The multilayer negative electrode of claim 1, wherein the natural graphite has a specific surface area (BET) of 2 m$^2$/g to 8 m$^2$/g.

3. The multilayer negative electrode of claim 2, wherein the weight ratio of the first negative electrode mixture layer to the total weight of the first negative electrode mixture layer and the second negative electrode mixture layer is decreased as the content of the natural graphite of the first negative electrode mixture layer is increased.

4. The multilayer negative electrode of claim 1, wherein the natural graphite is flake graphite, vein graphite, or amorphous graphite.

5. The multilayer negative electrode of claim 1, wherein the natural graphite has a tap density of 0.9 g/cc to 1.3 g/cc.

6. The multilayer negative electrode of claim 1, wherein a ratio of $I_{110}$ to $I_{003}$ of particles of the natural graphite at XRD diffraction is 20 to 40.

7. The multilayer negative electrode of claim 1, wherein the natural graphite has an average particle diameter (D50) of 5 μm to 30 μm.

8. The multilayer negative electrode of claim 1, wherein the artificial graphite is 0.5 m$^2$/g to 5 m$^2$/g in a range in which a specific surface area (BET) of the artificial graphite is smaller than that of the natural graphite.

9. The multilayer negative electrode of claim 1, wherein the artificial graphite is in a form of a powder, a flake, a block, a plate, or a rod.

10. The multilayer negative electrode of claim 1, wherein a ratio of $I_{110}$ to $I_{003}$ of particles of the artificial graphite at XRD diffraction is 5 to 20.

11. The multilayer negative electrode of claim 1, wherein at least one of the natural graphite and the artificial graphite is pitch-coated.

12. The multilayer negative electrode of claim 1, wherein some of solid contents of the first negative electrode mixture layer and the second negative electrode mixture layer is mixed therebetween so as not to form a boundary surface.

13. A lithium secondary battery comprising the multilayer negative electrode of claim 1.

14. The multilayer negative electrode of claim 1, wherein a weight ratio of natural graphite to artificial graphite in the first negative electrode mixture layer is from 4:6 to less than 1:1.

15. The multilayer negative electrode of claim 1, wherein a loading amount of the first negative electrode mixture layer ranges from 6 mg/cm$^2$ to 8 mg/cm$^2$.

16. The multilayer negative electrode of claim 1, wherein a loading amount of the second negative electrode mixture layer ranges from 8 mg/cm$^2$ to 10 mg/cm$^2$.

17. The multilayer negative electrode of claim 1, wherein the second negative electrode mixture layer is applied on the first negative electrode mixture layer before drying the first negative electrode mixture layer.

18. A multilayer negative electrode comprising:
a negative electrode current collector configured to transfer electrons between an outer lead and a negative electrode active material;
a first negative electrode mixture layer formed on one surface or both surfaces of the current collector and comprising natural graphite and artificial graphite as a negative electrode active material; and
a second negative electrode mixture layer formed on the first negative electrode mixture layer and comprising natural graphite and artificial graphite as a negative electrode active material,
wherein an amount of the natural graphite present in the first negative electrode mixture layer is from 15% by weight to 75% by weight based on a total weight of the first negative electrode mixture layer,
wherein an amount of the natural graphite present in the second negative electrode mixture layer is from 0.1% by weight to 10% by weight based on a total weight of the second negative electrode mixture layer,
wherein a weight ratio of the first negative electrode mixture layer to the second negative electrode mixture layer is 1:9 to 5:5,
wherein an amount of the artificial graphite is greater than an amount of the natural graphite based on a total amount of the first negative electrode mixture layer and second negative electrode mixture layer.

* * * * *